United States Patent [19]
Whitehead et al.

[11] 4,456,331
[45] Jun. 26, 1984

[54] IMPROVED COMMUNICATIONS CABLE WITH LINES OF WEAKNESS

[75] Inventors: Graham K. Whitehead; Roger J. Bates, both of Ipswich, England

[73] Assignee: The Post Office, London, England

[21] Appl. No.: 386,524

[22] Filed: Jun. 9, 1982

Related U.S. Application Data

[63] Continuation of Ser. No. 150,922, May 19, 1980, abandoned.

[30] Foreign Application Priority Data

May 22, 1979 [GB] United Kingdom ............ 7917767

[51] Int. Cl.³ .................................................. G02B 5/16
[52] U.S. Cl. .................................................. 350/96.23
[58] Field of Search ..................................... 350/96.23

[56] References Cited

U.S. PATENT DOCUMENTS

4,038,489 7/1977 Stenson et al. ............ 350/96.23
4,054,365 10/1977 Marx et al. ................. 350/96.23

FOREIGN PATENT DOCUMENTS

2508315 9/1976 Fed. Rep. of Germany.
2507583 9/1976 Fed. Rep. of Germany.
2321133 3/1977 France.
2383539 10/1978 France.
2401434 3/1979 France.
1398848 6/1975 United Kingdom.

Primary Examiner—John D. Lee
Assistant Examiner—Frank González
Attorney, Agent, or Firm—Kemon & Estabrook

[57] ABSTRACT

A communications cable based on optical fibres comprises a core 2 with external helical channels 13. The fibres 6 in the channels are accessible through removable parts 15 of an outer sheath 4.

4 Claims, 1 Drawing Figure

U.S. Patent  Jun. 26, 1984  4,456,331
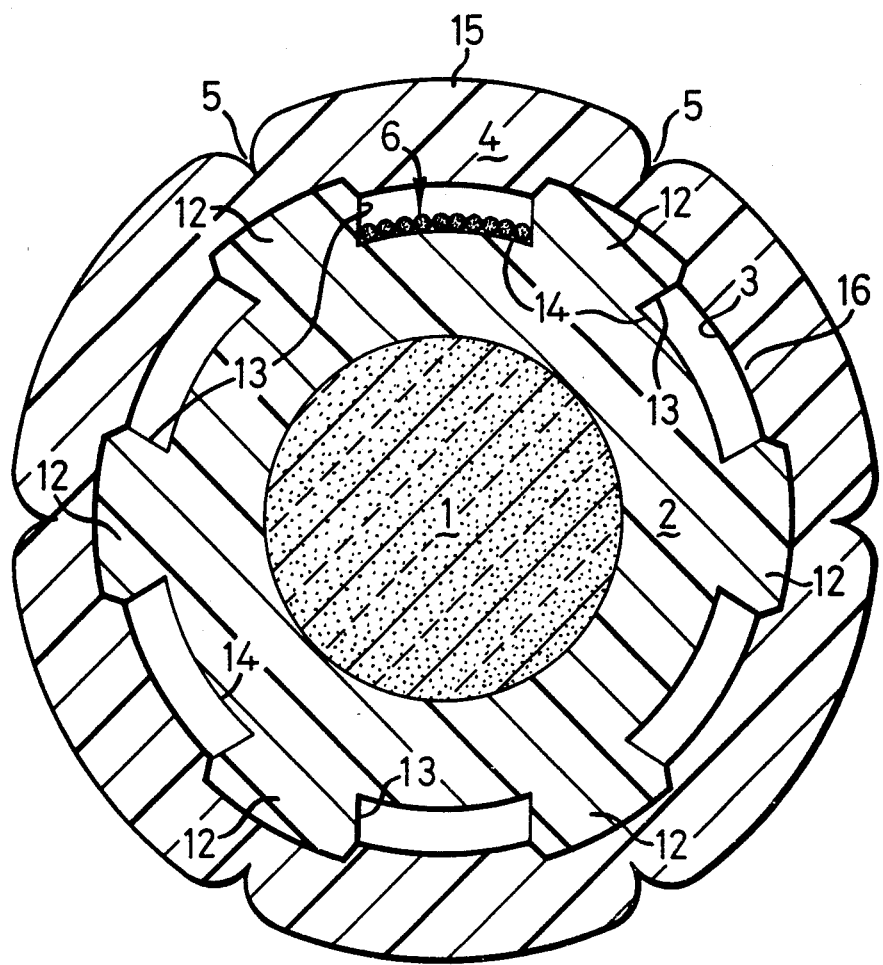

IMPROVED COMMUNICATIONS CABLE WITH LINES OF WEAKNESS

This a continuation of application Ser. No. 150,922, filed May 19, 1980, now abandoned.

DESCRIPTION

This invention relates to a communications cable primarily for use in telephone links. More specifically the invention is concerned with cables wherein the signals are transmitted along optical fibres, i.e. elongate optical waveguides of glass or silica.

A communications cable based on optical fibres has been proposed wherein the fibres extend along the axial centre of the cable and are surrounded by one or more protective layers and usually an outer sheath. The problem in such a cable is to obtain access to the individual fibres.

According to the present invention a communications cable comprises a core, a plurality of channels each of which is dimensioned to contain a layer of optical fibres running along the outer peripheral surface of the core and an external sheath covering the core, the sheath being openable at locations positioned over at least some and preferably all of the channels whereby external access to the fibres in the channel can be obtained.

The core can be made of hard plastics material, suitably reinforced, thereby providing the necessary strength for the cable as a whole, whilst the outer sheath conveniently made again of hard plastics, preferably includes a waterproofing lining.

Preferably a removable strip of sheath defined by zones of weakness extends over each channel.

Although in principle the channels can extend parallel to the axis of the cable it is preferred that the channels and the strips mentioned above should extend helically around the channel advancing longitudinally. Optical fibres, particularly those made of glass, are subject to changes in properties when bent and the helical arrangement ensures that bending stresses are uniform over the entire length of cable thereby equalising any such changes that may occur.

A particular embodiment of the invention will now be described with reference to the accompanying drawing which is a cross sectional view twenty times real size.

The communications cable illustrated comprises a central core 2 of hard plastics material for example high density polyethylene axially reinforced by glass fibres at 1. The plastics core member 2 is generally annular with polygonal radially outwardly extending ribs 12. Channels 13 are defined between adjacent ribs 12. A long strip 3 of aluminium is folded longitudinally into a tube and fitted over ribs 12. An outer sheath also of hard plastics material such as high density polyethylene is fitted hot over the strip 3 and on cooling shrinks into the channels 13 as shallow projections 16 accommodated and limited by the flexing strip 3. The tube 3 provides a water barrier and also serves as a support for the outer sheath 4. A V-shaped indentation 5 providing a weakness line extends over the centre of each rib 12 so that the sheath section defined between adjacent indentations 5 constitutes a removable cover 15 for the channel 13 underneath it.

The ribs 12, channels 13 and indentations 5 advance helically around and along the cable.

On the floor 14 of each channel 13 are ten optical fibres 6 arranged in a single layer so that each individual fibre is selectively accessible from the exterior of the cable on removal of cover 15.

Each fibre is colour coded to indicate its function. The colour coding is achieved by colouring the plastics coating of individual fibres by adding an inorganic pigment to the talc bath through which the fibres are passed after application of the resin primary coating.

In use selective access can be achieved to a selected part of any channel 13 and hence any fibre 6 in the channel by an operator cutting along the relevant indentations 5 of weakness and stripping off the cover part 15 of the sheath 4 defined therebetween.

The invention thus provides the possibility of selective access to any fibre in the cable from which stem a number of operational advantages. For example considering the cable described above as used as a local telephone cable one or more of its fibre lines can be taken off at any point to provide service for a customer without disturbing the other fibre lines. The portions of these lines beyond the take-off point will now be "dead" but can be left in situ so that if at a later date the service to that particular customer is discontinued they can be rejoined to the corresponding portions on the exchange side and used to provide service for another customer further along the cable route.

We claim:

1. In a communications cable comprising a core, a plurality of ribs extending along the core, channels defined between the ribs each of which is dimensioned to contain a layer of optical fibers running along the outer peripheral surface of the core and an external sheath covering the core the improvement of indentations providing lines of weakness extending longitudinally directly over the ribs defining the channels thereby rendering a channel and the fibers in it accessible by cutting along adjacent indentations to said ribs and removing the sheath section between the cuts.

2. A cable as claimed in claim 1 wherein the channels advance helically along the cable.

3. A cable as claimed in claims 1 or 2 wherein said core constitutes a strength member for the cable.

4. A cable as claimed in claim 3 including a water barrier surrounding the core under said external sheath.

* * * * *